(12) United States Patent
Simmons et al.

(10) Patent No.: US 8,590,505 B2
(45) Date of Patent: Nov. 26, 2013

(54) METHOD OF OPERATING A COMPRESSION IGNITION INTERNAL COMBUSTION ENGINE

(75) Inventors: Brandon M. Simmons, Seymour, IN (US); David F. May, Columbus, IN (US); Cheng G. Li, Midland, MI (US); Clark H. Cummins, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 262 days.

(21) Appl. No.: 12/992,508

(22) PCT Filed: Jul. 1, 2009

(86) PCT No.: PCT/US2009/049420
§ 371 (c)(1),
(2), (4) Date: Nov. 12, 2010

(87) PCT Pub. No.: WO2010/003001
PCT Pub. Date: Jan. 7, 2010

(65) Prior Publication Data
US 2011/0088656 A1    Apr. 21, 2011

Related U.S. Application Data

(60) Provisional application No. 61/078,057, filed on Jul. 3, 2008.

(51) Int. Cl.
*F02B 47/02* (2006.01)
(52) U.S. Cl.
USPC ................ 123/299; 123/27 GE; 123/525
(58) Field of Classification Search
USPC ........ 123/295, 297, 299, 300, 304, 305, 431, 123/491, 575–577, 559.1, 568.11, 604, 606, 123/27 GE, 1 A, 3, 25 A, 25 B, 25 F, 25 E, 123/25 R See application file for complete search history.

(56) References Cited

U.S. PATENT DOCUMENTS

| | | |
|---|---|---|
| 2,404,094 A | 7/1946 | Robertson |
| 4,333,739 A | 6/1982 | Neves |
| 4,721,081 A | 1/1988 | Krauja et al. |

(Continued)

FOREIGN PATENT DOCUMENTS

EP    1378644 B1    5/2006

OTHER PUBLICATIONS

Robert Bosch GMBH, Automotive Handbook, 3rd Ed., Table 2 on p. 231; 362-366; 369; 372-375; 428-511; 430-445; 520-521; Stuttgart, Germany, 1993.

*Primary Examiner* — John Kwon
*Assistant Examiner* — Johnny Hoang

(57) ABSTRACT

A method of operating a combustion ignition engine comprises introducing an amount of a compressibly non-ignitable fuel into the air induction system of a compression ignition engine during the intake stroke of the engine and then injecting an amount of compressibly ignitable fuel (e.g., Diesel fuel) in the cylinder chamber at a crank angle sufficiently advanced during the compression stroke of the compression ignition engine such that the compressibly ignitable fuel and incompressible non-ignitable fuel ignite and combust such that substantially all of the fuel in the cylinder is combusted, where the amount of compressibly non-ignitable fuel introduced into the cylinder has an energy content that is at least about 50% to at most about 99% of the total energy content of the total amount of fuel introduced.

43 Claims, 3 Drawing Sheets

(56) References Cited

U.S. PATENT DOCUMENTS

| | | | |
|---|---|---|---|
| 5,291,865 A * | 3/1994 | Sasaki | 123/298 |
| 5,628,805 A | 5/1997 | Lif et al. | |
| 5,832,880 A * | 11/1998 | Dickey | 123/25 C |
| 6,298,825 B1 | 10/2001 | Hupperich et al. | |
| 7,320,298 B1 * | 1/2008 | Ahern | 123/25 R |
| 7,320,302 B2 | 1/2008 | Kobayashi | |
| 8,396,645 B2 * | 3/2013 | Bakharev | 701/103 |
| 2002/0007816 A1 * | 1/2002 | Zur Loye et al. | 123/295 |
| 2002/0040692 A1 | 4/2002 | LaPointe et al. | |
| 2003/0019444 A1 * | 1/2003 | Suh et al. | 123/70 R |
| 2004/0118116 A1 * | 6/2004 | Beck et al. | 60/601 |
| 2006/0011165 A1 * | 1/2006 | Frey et al. | 123/299 |
| 2006/0124104 A1 * | 6/2006 | Altenschmidt | 123/299 |
| 2006/0180121 A1 | 8/2006 | Wickman et al. | |
| 2006/0185644 A1 | 8/2006 | Hashimoto et al. | |
| 2007/0119391 A1 | 5/2007 | Fried et al. | |
| 2007/0131180 A1 | 6/2007 | Roehm | |
| 2007/0245992 A1 * | 10/2007 | Hefley | 123/90.17 |
| 2007/0251497 A1 * | 11/2007 | Altenschmidt | 123/445 |
| 2008/0097679 A1 * | 4/2008 | Keays | 701/102 |
| 2008/0098990 A1 * | 5/2008 | Hiyoshi et al. | 123/48 B |
| 2008/0236546 A1 * | 10/2008 | Kakuho et al. | 123/406.3 |
| 2008/0245342 A1 * | 10/2008 | Werner | 123/491 |
| 2009/0188466 A1 * | 7/2009 | Wiens | 123/244 |
| 2009/0211726 A1 | 8/2009 | Bank et al. | |
| 2009/0294552 A1 * | 12/2009 | Trapasso et al. | 239/132 |
| 2010/0037851 A1 * | 2/2010 | Keays | 123/25 |

* cited by examiner

US 8,590,505 B2

METHOD OF OPERATING A COMPRESSION IGNITION INTERNAL COMBUSTION ENGINE

CLAIM OF BENEFIT OF FILING DATE

The present application claims the benefit of the filing date of U.S. application Ser. No. 61/078,057, filed Jul. 3, 2008, which is hereby incorporated by reference for all purposes.

FIELD OF THE INVENTION

This invention relates to a method of operating a compression ignition engine, typically referred to as a Diesel engine.

BACKGROUND OF THE INVENTION

Compression combustion engines (Diesel) have gained popularity due to their high torque and excellent fuel mileage compared to spark ignited gasoline engines. Generally, the increased fuel efficiency of Diesel, however, results in higher NOx and particulate matter emissions.

As the awareness of the danger NOx emissions and Diesel soot presents to health collides with the need for greater fuel efficiency that Diesel engines provide, regulations have been enacted curbing the amount of Diesel soot permitted to be emitted. To meet these challenges, expensive soot filters and aftertreatments (e.g., three way catalytic converters; selective reduction catalyst 'addition of urea') have been used as well intricate engine control and fuel injection. It has been estimated that these pre and post-treatments each equal to ⅓ the cost of a Diesel engine (i.e., ⅔s of the cost of the Diesel engine is related in some way to reduction of emissions). In addition, as the regulations become ever more stringent, the fuel efficiency of Diesel engines is reduced all the while Diesel fuel gets substantially more expensive.

Accordingly, it would be desirable to provide a method of operating a compression ignition engine that overcomes one or more of the problems of the prior art such as one of those described above (e.g., elimination of pre and aftertreatment while meeting present and future regulations).

SUMMARY OF THE INVENTION

Applicants have discovered a method of operating a combustion ignition engine (interchangeably referred to as a Diesel engine herein) in a manner that realizes the efficiencies of Diesel engine absent pre and aftertreatments while reducing particulate matter and NOx all the while achieving efficiencies approaching Diesel engines even without pre and aftertreatments.

A first aspect of the invention is a method of operating a combustion ignition engine comprising, (a) introducing an amount of a compressibly non-ignitable fuel into the air induction system of a compression ignition engine during the intake stroke of said engine such that a mixture of the compressibly non-ignitable fuel and air is introduced into a cylinder of said engine, (b) injecting an amount of compressibly ignitable fuel in a cylinder chamber at a crank angle sufficiently advanced during the compression stroke of the compression ignition engine such that the compressibly ignitable fuel and incompressible non-ignitable fuel ignite and combust such that substantially all of the fuel in the cylinder is combusted, wherein the amount of compressibly non-ignitable fuel introduced into the cylinder has an energy content that is at least about 50% to at most about 99% of the total energy content of the total amount of fuel introduced into the cylinder from the compressibly non-ignitable fuel and compressibly ignitable fuel.

Surprisingly, the method allows the operation of a combustion ignition engine at high efficiency with substantially reduced NOx and particulate matter emissions.

DETAILED DESCRIPTION OF THE INVENTION

Figure 1:
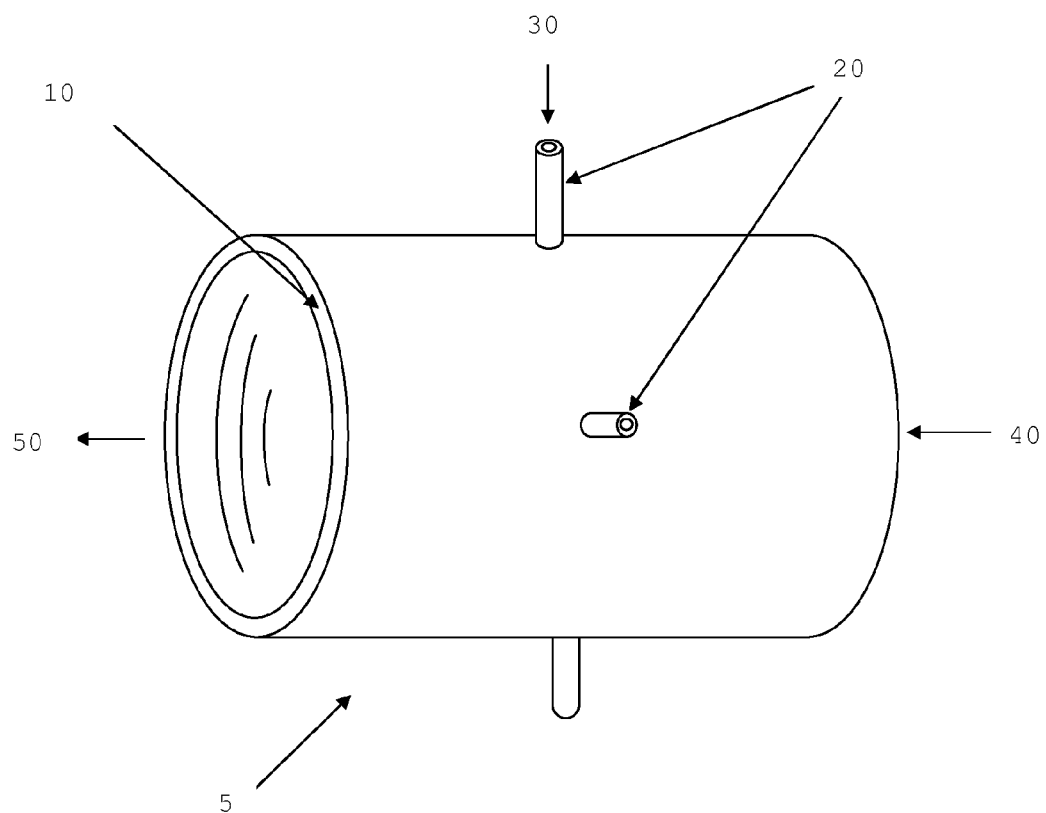
FIG. 1. Fuel delivery body used to deliver compressibly non-ignitable fuel of Example 1

In the method, two fuels are used and introduced into the cylinder of a Diesel engine. The first fuel is a compressibly non-ignitable fuel. This fuel at the compression ratios and operating compression ratios of typical Diesel engines will not combust. Typical Diesel engines operate at compression ratios of about 16 to 35 with such compression ratios also spanning the effective compression ratios that result from supercharging, turbocharging or the like. These compressibly non-ignitable fuels, typically have octane ratios of at least about 110, 115, 120, 125, 130, 135, 145, or even above 150 so long as said fuel will still ignite upon injection of compressibly ignitable fuel into the cylinder of the Diesel engine. Octane as used herein refers to research octane number.

Examples of these compressibly non-ignitable fuels include fuels comprised of water and organic compounds that are miscible with water. To enhance the ability to form a vaporized charge in the air induction system, such organic compounds, generally have at most about 10 carbons and desirably at most about 5 carbons and most desirably at most about 4 carbons. Such organic, to be miscible, typically will have one or more polar organic groups such as an alcohol, ether, ester, carboxylic acid, amine and the like. Exemplary compounds include alcohols such as methanol, ethanol, butanol, propanol, ethylene glycol and propylene glycol.

When using compressibly non-ignitable fuels comprised of water and organic compounds that are miscible with water, the amount of water generally is at least about 20% by volume of the fuel and may be in ascending order at least about 25%, 27%, 30%, 32%, 35% or 38% to generally at most about 65%, 60%, 55% or 50%. In fuels containing water and alcohol (e.g., methanol, ethanol, butanol, propanol, ethylene glycol, propanol glycol or mixture thereof), there may also be some small components of other compounds useful to change a desired property such as acetylene or other hydrocarbon such as described in U.S. Pat. Nos. 2,404,094 and 4,333,739.

The introducing of the compressibly non-ignitable fuel in the air induction system (i.e., intake manifold) may be accomplished by any suitable method for introducing a homogeneous charge into an air induction system such as a carburetor or injector, which may be controlled by known mechanical or electronic methods such as described on pages 430-445 in Automotive Handbook, $3^{rd}$ Ed., Robert Bosch GmbH, Stuttgart, Germany, 1993.

It is desirable for the non-ignitable fuel to be introduced using an injector or multiple injectors, wherein the size of the droplets of the fuel from the injector enter into the air being drawn through the intake manifold are controlled and can be varied. Generally, the average diameter of the droplets by number is at most about 50, 30, 25, 20, 15, 10 or 5 micrometers in size to at least about 0.1 micrometer. It is also desirable to have the introducing of the compressibly non-ignitable fuel to be introduced such that it is aided by gravity to enter into the air induction system and cylinder of the engine (e.g., the injector is position on the top surface of the intake manifold, with the manifold being positioned above the cylinder.

The introducing, particularly, by injecting the compressibly non-ignitable fuel desirably occurs within about 20 cm, 15, 10 or even 5 cm to as close as practical, but generally at least a couple of cms to allow for good mixing of the fuel and air, to the intake valve of each cylinder. For example, if the engine has 6 cylinders, there would be 6 injectors mounted on the intake manifold such that each cylinder had its own injector, electronically controlled, such that it injected fuel at the desired crank angle during the intake stroke of the piston in the cylinder. Depending on whether there is one common injector or individual injectors at each cylinder of the intake manifold, the injector may be activated at differing times during the intake stroke of the piston in a cylinder.

As an illustration, when there is an injector at each cylinder, the injector for the compressibly non-ignitable fuel, generally, would be activated at between 90 and 0 degrees crank angle prior to the intake valve opening. Degrees of crank angle refers to the position of the piston as given by the crankshaft with regard to an event occurring such as the piston being at the top dead center "TDC" (top most) or bottom dead center "BDC" (bottom most), which is well known and depicted, for example, on page 369 of *Automotive Handbook, 3rd Ed.*, Editor in Chief: U. Adler, Robert Bosch GmbH, Stuttgart, Germany, 1993.

In an embodiment, energy or heat is provided to the compressibly-nonignitable fuel, prior to being injected into the air induction system. Such input of energy, may be desirable to aid in forming a homogeneous mixture/vapor with air in the air induction system such as when there is, for example, a substantial amount of water in the compressible nonignitable fuel. Such introduction of energy may be mechanical (e.g., ultrasonics using an electrorestrictive or magnetorestrictive (magnetostrictive) transduction devices such as a piezoelectric transducer or a giant magnetorestrictive (magnetostrictive) device), or simply by heating using known methods. In a particular embodiment, the compressibly nonignitable fuel is heated using the waste heat of the exhaust. In another, said fuel is heated by using a phase change material that stores the heat from the coolant system or exhaust system, which is useful upon cold start-up of the engine, because the phase change material can introduce heat to said fuel aiding in cold start up. Exemplary phase change materials that may be used include those in co-pending U.S. provisional application Ser. No. 61/030755 having an inventor David Bank.

In another embodiment, upon cold start up, the engine may be started solely using the compressibly ignitable fuel. Cold start-up is, generally, when the entire block of the engine is at ambient temperature. The use, solely of the compressibly ignitable fuel, may be used for the first couple of seconds of operation to a minute or two. Start-up may also be aided by known auxiliary starting devices such as described on pages 520 and 521 of Automotive Handbook, 3rd Ed., Editor in Chief: U. Adler, Robert Bosch GmbH, Stuttgart, Germany, 1993.

After the introduction of the compressibly non-ignitable fuel, the intake valve closes as is typical in Diesel engine near bottom dead center (BDC) of the piston and the compression stroke begins as known in the art. The compressibly ignitable fuel is injected into the cylinder and auto-ignites in a similar manner as typical known Diesel engines except that the amount of this injected fuel is an amount that is less than 50% of the energy content of the fuel in the cylinder to at least about an energy content sufficient to cause combustion of the compressibly-non-ignitable fuel (typically at least 1% of the total amount of fuel in the cylinder (e.g., ethanol and diesel fuel, where the ethanol may be present in an ethanol-water solution). The energy content of the compressibly-ignitable fuel, depending on operating conditions, may desirably contain an energy content that is at most about 48%, 46%, 44%, 42%, 40%, 38%, 36% or 34% to at least about 1%, 5%, 10%, 15%, or 20%.

The energy content of the injected compressibly-ignitable fuel may vary depending on the operating conditions of the engine within the range given above. Such varying, may be done by any suitable method such as known engine management using known electronic control methods (see for example, pages 428-511 of *Automotive Handbook, 3rd Ed.*, Robert Bosch GmbH, Stuttgart, Germany, 1993).

The compressibly-ignitable fuel may be any compressibly ignitable fuel that combusts under the compression of the compression ignition engine described above upon injection into the cylinder. This typically means that such compressibly ignitable fuel meets the minimum standards for a Diesel fuel such as those given in Table 2 on page 231 of Automotive Handbook, 3rd Ed., Robert Bosch GmbH, Stuttgart, Germany, 1993 and such fuels are readily available. In one embodiment the compressibly ignitable fuel may be an alcohol mixed with an ignition improver such as those known in the art, for example, those referred to as E95 or E96.

The injecting of the compressibly ignitable fuel into the cylinder chamber occurs at a crank angle sufficiently advanced during the compression stroke of the compression ignition engine such that the compressibly ignitable fuel and compressibly non-ignitable fuel ignite and combust such that substantially all of the fuel in the cylinder is combusted. Substantially all of the fuel is combusted when the amount of hydrocarbons remaining in the exhaust is at most 500 ppm by volume. Generally, the injection occurs at a crank angle depending on the operating conditions (e.g., ambient temperature, rpm, atmospheric pressure and load) at the most efficient operation, which is readily determined on a dynamometer.

In one embodiment, it may be desirable to start the injecting of the compressibly ignitable fuel into the cylinder at a crank angle more advanced than an engine run in the absence of the compressibly non-ignitable fuel with all other engine conditions being essentially the same. The compressibly ignitable fuel, generally, is injected at a crank angle that is at least 5% more advanced than the same engine running solely with the same compressibly ignitable fuel at the same engine conditions (e.g., rpm, load and fuel energy content) and may be at least 6%, 7%, 8%, 9%, 10%, 15%, 20%, 25%, 30%, 35%, 40%, 45% and even 50% advanced injection. For example, if the Diesel running only on the compressibly ignitable fuel being injected had a timing of 20° before top dead center (BTDC) of the piston for optimum power, the timing of the injection of the same engine in which the compressibly non-ignitable fuel is introduced would typically be at least 21° BTDC for optimal power. In general, said injection may occur from 3° to 50° before top dead center of the piston.

The injection may be by any suitable injector or cylinder chamber shape such as those known in the art, and, for example, describe on pages 362-366 of Automotive Handbook, 3rd Ed., Robert Bosch GmbH, Stuttgart, Germany, 1993.

The total air/fuel (compressibly-nonignitable and compressibly ignitable fuel) ratio, generally, is substantially greater than stoichiometry (i.e., the amount, by mole of oxygen, is greater than that needed to oxidize the carbon and hydrogen in the fuel to $CO_2$ and $H_2O$). Generally, the air/fuel ratio by mole is at least about 1.2, 1.4, 1.6 1.8 or even 2 to the practical limitations of the engine (i.e., amount of air that can be introduced into the engine during the intake stroke of the piston, which is dependent, for example, on the rpm and pressure in the intake manifold). Generally, the air/fuel ratio is at most 10 by mole. Illustratively, the engine using mass ratios of air to fuel, which is common for internal combustion engines typically will be at least about 25 to 35 under load to as high as 90 or above at idle.

In performing the method of the invention, to reiterate, the compression ratio is typically from about 16 to about 35 (volume of the cylinder at BDC/volume of the cylinder at TDC). The effective compression ratio falls, generally, within the just mentioned ratio. Effective compression ratio merely takes into account the increase in the maximum pressure within the cylinder upon compression when the air in the air induction system is precompressed. Desirably, the compression ratio is at least about 17, 18, 19, or 20 to at most about 30, 28, 26 or 25.

In an embodiment, the air within the air induction system is precompressed (i.e., the pressure is raised compared to a naturally aspirated engine) such as by supercharging or turbocharging such as described on pages 372-375 of *Automotive Handbook, 3rd Ed.*, Robert Bosch GmbH, Stuttgart, Germany, 1993. In a particular embodiment the precompression is carried out by a variable geometry turbocharger. In this embodiment, it has been discovered that such a turbocharger runs more efficiently than when employed in an engine not utilizing the method of this invention. This may be due to the facilitation of the extraction of useful heat by the presence of steam in the exhaust when using a compressibly nonignitable fuel having substantial amounts of water (e.g., greater than about 10% by volume).

When performing the method of the invention it has been surprisingly found that the emissions are substantially less than the same engine run merely with the compressibly ignitable fuel. That is the NOx (nitrous oxides), HC (hydrocarbons) and particulate matter are substantially lowered. As an illustration, each individually or combined of the aforementioned noxious emissions are at most 75%, 50, 40%, 30%, 20%, 10% or even 5% of the emissions of the same engine run under the same conditions without the use of the compressibly nonignitable fuel in the method of this invention. Typically the amount of HCs in the exhaust is at most about 500, 400, 300, 200, 100, 50, 25, 10 or 5 ppm by volume. Typically the amount of particulate matter in the exhaust is at most about 150, 100, 75, 50, 25, 10, 5, 1, 0.1, 0.01, or even 0.001 mg/m$^3$ of exhaust. Typically, the amount of NOx in the exhaust is at most about 300, 250, 200, 150, 100 ppm by volume.

Because of the surprisingly large reduction in particulate matter and other emissions using the method of the invention, this allows for the lubricating oil of the engine to be changed not by draining the oil and then replacing it with fresh lubricating oil, but by removing the lubricating oil from the oil pan and injecting it with the compressibly ignitable fuel where it combusts with the other fuels added to the cylinder. The removal may be easily controlled by the same engine management system to occur after certain numbers of hours of operation of the engine, with indicators to the operator to add an amount of lubricating oil to the engine as needed.

Below are specific examples within the scope of the invention and comparative examples. The specific examples are for illustrative purposes only and in no way limit the invention described herein.

EXAMPLES

Example 1

Figure 2:
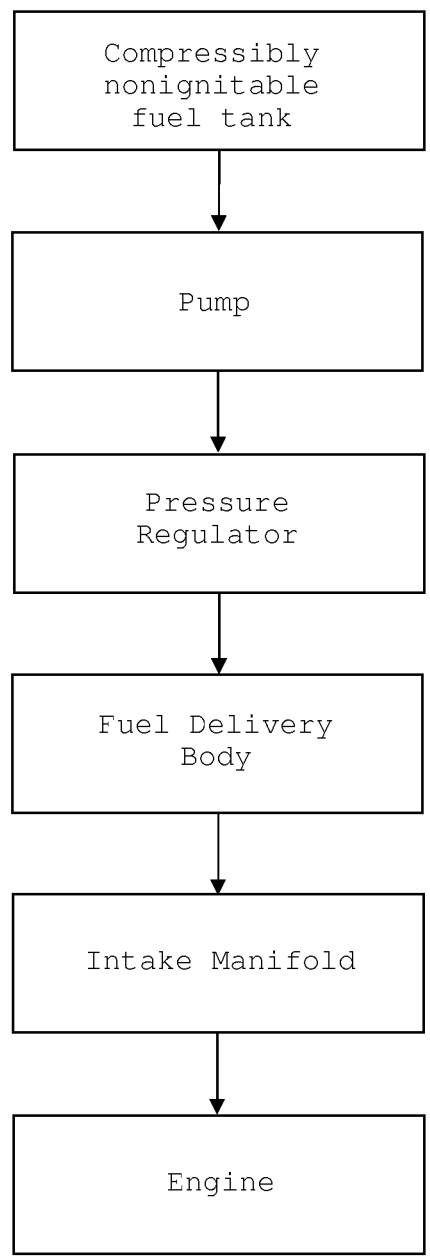
FIG. 2 Schematic of the fuel delivery system of the compressibly non-ignitable fuel of Example 1.
Figure 3:
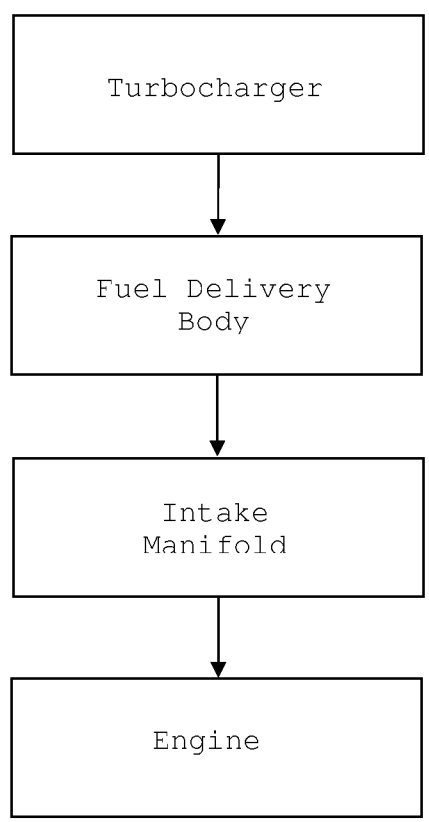
FIG. 3 Schematic of the air delivery system of Example 1.

A Cummins QSB 5.9 liter turbocharged Diesel engine with a high pressure common rail configuration was modified as follows. A twelve inch long four inch outer diameter steel tube 10 having a wall thickness of 0.062" was fitted with four fixed orifice injectors 20 equispaced around its circumference at about the midpoint of its length as shown in FIG. 1 to form a fuel delivery body 5. Compressibly non-ignitable fuel 30 is delivered to the injectors 20 at constant pressure at each injector as shown schematically in FIG. 2. Intake air 40 is delivered to the fuel delivery body 5 by metal tubes connected by rubber tubes having an inner diameter near that of the outer diameter of the fuel delivery body 5 and the connecting metal tubes. The intake air is taken from output of the turbocharger of the engine after being passed through a separate controllable heat exchanger, which is depicted schematically in FIG. 3. The intake air 40 is mixed with the fuel 30 within fuel delivery body 5 to form a compressibly nonignitable fuel air mixture 50 that is then carried to the intake manifold by a tube in same manner as just described for the intake air 40.

The modified engine was run on an Analytical Engineering Incorporated Dynomometer test cell with a compressibly non-ignitable fuel of 40% water by volume in ethanol and a compressibly ignitable fuel that was a conventional blend #2 Diesel fuel for on road use purchased in 2008. The engine was run at the following conditions:

Rpm: 1800
Diesel fuel injection timing: 10 degrees BTDC (before top dead center)
Diesel fuel injection duration: 500 microseconds
Diesel fuel volume per injection: 40 mm$^3$
Diesel fuel: ~1 part by volume
EtOH-40% water: ~5 parts by volume
EtOH-water pressure: ~50 psi
Ambient temperature: ~70° F.
Ambient pressure: 29.26" Hg
Intake air pressure (manifold):
Intake air temperature (manifold): ~80° F.

The measured engine outputs at these conditions were:
Horsepower: ~70
Torque: ~200 foot-pounds
Carbon dioxide: ~5% by volume
Carbon monoxide: ~4200 ppm by volume
NOx: ~90 ppm by volume
Hydrocarbons: none detected
Soot: none observed At the fuel ratios of the running of the engine by the method, the percentage of the total energy provided by the compressibly ignitable fuel was about 35% of the total fuel energy content.

What is claimed is:

1. A method of operating a compression ignition engine having an air induction system, an intake stroke, and compression stroke comprising, (a) introducing a compressibly non-ignitable fuel into the air induction system of the compression ignition engine during the intake stroke of said engine such that a mixture of the compressibly non-ignitable fuel and air is introduced into a cylinder of said engine, (b) injecting a compressibly ignitable fuel in the cylinder at a crank angle sufficiently advanced during the compression stroke of the compression ignition engine (c) igniting and combusting substantially all of the compressibly ignitable fuel and incompressible non-ignitable fuel, said compressibly ignitable fuel and incompressible non-ignitable fuel introduced and injected having a total energy content of fuel introduced and injected into the cylinder, wherein the compressibly non-ignitable fuel is introduced into the cylinder in an amount having an energy content that is at least about 50% to at most about 99% of the total energy content of fuel introduced and injected into the cylinder.

2. The method claim 1 wherein the amount of the compressibly non-ignitable fuel contains at least about 50% to at most about 98% of the total energy content of the fuel injected and introduced into the cylinder.

3. The method of claim 2, wherein the compressibly non-ignitable fuel contains at least about 60% of the total energy content of the fuel introduced and injected into the cylinder.

4. The method of claim 2, wherein the compressibly non-ignitable fuel contains at most about 90% of the energy content of the total energy content of the fuel introduced and injected into the cylinder.

5. The method of claim 1, wherein the compressibly non-ignitable fuel has an octane rating of at least about 110 to at most about 250.

6. The method of claim 5, wherein the non-ignitable fuel has an octane rating of at least about 120.

7. The method of claim 6, wherein the non-ignitable fuel has an octane rating of at least about 130.

8. The method of claim 1, wherein the compressibly non-ignitable fuel is a solution of an organic compound and water.

9. The method of claim 8, wherein the organic compound has at most about 10 carbons.

10. The method of claim 9, wherein the organic compound has at most about 6 carbons.

11. The method of claim 10, wherein the organic compound has an alcohol, ether, ketone, carboxylic acid group or combination thereof.

12. The method of claim 11, wherein organic compound is an alcohol.

13. The method of claim 12, wherein the alcohol is methanol, ethanol, propanol, butanol or mixture thereof.

14. The method of claim 13, wherein the alcohol is methanol, ethanol or combination thereof.

15. The method of claim 12, wherein the water is present in an amount at least about 20% to at most about 60% by volume of the solution.

16. The method of claim 15, wherein the amount of water is at least about 25%.

17. The method of claim 16, wherein the amount of water is at least about 30%.

18. The method of claim 17, wherein the amount of water is at least about 35%.

19. The method of claim 18, wherein the amount of water is at least about 38%.

20. The method of claim 1, wherein the compressibly non-ignitable fuel is heated or energy added thereto prior or during said fuel being introduced into the air induction system.

21. The method of claim 1, wherein the compressibly non-ignitable fuel is introduced by injecting a liquid spray into the air induction system.

22. The method of claim 21, wherein the injecting of the compressibly non-ignitable fuel creates spray droplets of said compressibly non-ignitable fuel having an average droplet size of at most about 25 micrometers in diameter.

23. The method of claim 21, wherein the injecting of the compressibly non-ignitable fuel is performed, wherein gravity assists in the introduction of the compressibly non-ignitable fuel air mixture into the cylinder of said engine.

24. The method claim 23, wherein the injecting of the compressibly non-ignitable fuel is performed within 10 cm of an intake valve for the cylinder.

25. The method of claim 1, wherein said engine has a plurality of cylinders and the compressibly non-ignitable fuel is introduced by injecting the compressibly non-ignitable fuel as a liquid spray into the air induction system within 5 cm of an intake valve for each cylinder.

26. The method of claim 1, wherein after combustion, there is essentially no hydrocarbons present after combustion of the compressibly ignitable and compressibly non-ignitable fuel in exhaust gases from said combustion of the compression ignition engine.

27. The method of claim 26, wherein the hydrocarbons are present in an amount that is at most about 500 ppm by volume of the exhaust gases.

28. The method of claim 1, wherein said engine has a compression ratio of at least about 16 to at most 35.

29. The method of claim 28, wherein said engine has a compression ratio of at least about 18 to at most about 30.

30. The method of claim 1, wherein the air in the air induction system is raised to a pressure above ambient pressure.

31. The method of claim 1, wherein the air contains an amount of oxygen that is at least 1.2 times an amount of oxygen stoichiometrically needed to combust the total amount of fuel introduced.

32. The method of claim 1, wherein the air contains an amount of oxygen that is at least 1.5 times the amount of oxygen stoichiometrically needed to combust the total amount of fuel introduced.

33. The method of claim 1, wherein the air contains an amount of oxygen that is at least 2 times the amount of oxygen stoichiometrically needed to combust the total amount of fuel introduced.

34. The method of claim 20, wherein at least a portion of the energy added to the compressibly non-ignitable fuel is from waste heat from the engine.

35. The method of claim 20, wherein at least a portion of the energy added is from a phase change material that has captured a portion of the waste heat of the engine.

36. The method of claim 25, wherein the injecting of the compressibly non-ignitable fuel initially occurs within 10° degrees crank angle of the opening of the intake valve.

37. The method of claim 36, wherein the injecting occurs after the opening of the intake valve.

38. The method of claim 36, wherein the injecting initially occurs prior to the opening of the intake valve.

39. The method of claim 1, wherein the crank angle where the injecting of the compressibly ignitable fuel into the cylinder initially occurs is more advanced than said engine run of the compressibly non-ignitable fuel with all other engine conditions being essentially the same.

40. The method of claim 1, wherein at least a portion of the compressibly ignitable fuel is lubricant from the engine.

41. The method of claim 1, where at least a portion of the compressibly ignitable fuel is an alcohol mixed with ignitor improvers.

42. The method of claim 41, wherein the alcohol is ethanol.

43. The method of claim 1, wherein said engine is initially started essentially using only the compressibly ignitable fuel.

* * * * *